(12) United States Patent
Luo et al.

(10) Patent No.: US 12,302,800 B2
(45) Date of Patent: May 20, 2025

(54) **METHOD FOR INTERPLANTING GRAPE AND *POLYGONATUM KINGIANUM* IN PHOTOVOLTAIC (PV) POWER PLANT**

(71) Applicant: China Institute of Water Resources and Hydropower Research, Beijing (CN)

(72) Inventors: Jiufu Luo, Beijing (CN); Xin Sui, Beijing (CN); Zhongxin Luo, Beijing (CN); Sainan Wu, Beijing (CN); Xiaolin Luo, Beijing (CN)

(73) Assignee: China Institute of Water Resources and Hydropower Research (CN)

( * ) Notice: Subject to any disclaimer, the term of this patent is extended or adjusted under 35 U.S.C. 154(b) by 0 days.

(21) Appl. No.: 18/224,060

(22) Filed: Jul. 20, 2023

(65) Prior Publication Data

US 2024/0122129 A1    Apr. 18, 2024

(30) Foreign Application Priority Data

Oct. 17, 2022   (CN) .......................... 202211265055.6

(51) Int. Cl.
*A01G 17/06*   (2006.01)
*A01G 25/02*   (2006.01)
(Continued)

(52) U.S. Cl.
CPC ............. *A01G 17/06* (2013.01); *A01G 25/02* (2013.01); *A01G 25/165* (2013.01);
(Continued)

(58) Field of Classification Search
CPC ............. A01G 17/06; A01G 2017/065; A01G 17/008; A01G 9/243; A01G 7/00; A01G 7/04
See application file for complete search history.

(56) References Cited

U.S. PATENT DOCUMENTS 5,711,109 A * 1/1998 Pitts ........................ A01G 17/02
47/46

FOREIGN PATENT DOCUMENTS

| CN | 102726273 A | 10/2012 |
| CN | 103535251 A | 1/2014 |

(Continued)

OTHER PUBLICATIONS

First Office Action with English Translation for Chinese Application No. 202211265055.6, dated Apr. 7, 2024, 15 pages.

*Primary Examiner* — Kristen C Hayes

(74) *Attorney, Agent, or Firm* — Dickinson Wright PLLC

(57) ABSTRACT

Provided is a method for interplanting grape and *Polygonatum kingianum* in a photovoltaic (PV) power plant. The method includes: building a grapevine traction frame which is higher in south and lower in north in a space formed by a plurality of PV modules in the PV power plant, the grapevine traction frame includes a plurality of uprights, a plurality of traction crossbars, a plurality of supporting bars and a wire mesh; making a grape ridge below the south of each PV module and planting grape seedlings; maintaining two branches for each of the grape seedlings in the same year of grape planting, and pulling the two branches along the traction crossbar located in south; pulling branches grown out of arm bud points southwards onto the wire mesh in the next year of grape planting; sowing and ploughing a green manure, making planting beds in a shade and planting *Polygonatum kingianum*.

10 Claims, 2 Drawing Sheets

(51) Int. Cl.
*A01G 25/16* (2006.01)
*H02S 20/10* (2014.01)
*A01C 14/00* (2006.01)
*A01G 22/05* (2018.01)
*A01G 22/15* (2018.01)
*A01G 22/60* (2018.01)

(52) U.S. Cl.
CPC ............ *A01G 25/167* (2013.01); *H02S 20/10* (2014.12); *A01C 14/00* (2013.01); *A01G 22/05* (2018.02); *A01G 22/15* (2018.02); *A01G 22/60* (2018.02)

(56) References Cited

FOREIGN PATENT DOCUMENTS

| | | |
|---|---|---|
| CN | 107278794 A | 10/2017 |
| CN | 207854651 U | 9/2018 |

\* cited by examiner

METHOD FOR INTERPLANTING GRAPE AND *POLYGONATUM KINGIANUM* IN PHOTOVOLTAIC (PV) POWER PLANT

CROSS REFERENCE TO RELATED APPLICATION

This patent application claims the benefit and priority of Chinese Patent Application No. 202211265055.6, filed with the China National Intellectual Property Administration on Oct. 17, 2022, the disclosure of which is incorporated by reference herein in its entirety as part of the present application.

TECHNICAL FIELD

The present application relates to the technical field of new energy "PV+", and in particular, to a method for interplanting grape and *Polygonatum kingianum* in a photovoltaic (PV) power plant.

BACKGROUND

In face of challenges on the demands for green and low-carbon transformation of energy sources, the purpose of achieving "carbon peaking and carbon neutrality", as well as the influences on the ecological and economic development caused by climate change, and contradiction between people and land, people have continuously deepened the technical studies on the exploitation and sustainable development of renewable energy sources. Solar energy, as a renewable and eco-friendly energy source, is of great importance in the courses of changing energy consumption structure and substituting fossil energy resources. It is an effective approach to explore green PV generation and compound patterns of land utilization in PV power plants to ease the contradiction between ecology and development, accelerate regional green development and to promote the overall yield of land in the PV power plant.

However, PV power plants, in particular to the PV power plants in karst rocky desertification area, are usually located in the regions rich in light resources. PV power plants in karst rocky desertification area are rich in light resources and thus, not suitable for the growth of sciophytes originally. However, due to the shading of PV modules, the near-surface environment is changed to create a shaded environment; in such way, it is suitable for planting sciophytes, in particular to *Polygonatum kingianum*, which provides an opportunity to change the original land utilization pattern.

Currently, sciophytes are usually planted in the PV power plant by the following two ways: one is to build a sunshade by labor for shading sciophytes with a large number of material inputs, e.g., plant and glass sheds, which greatly increases the construction cost; two is to plant sciophytes in the shaping areas formed by PV modules in the PV power plant; however, there exists problems of single output and low land utilization rate in the PV power plant.

Therefore, it is rather important to study how to achieve the purposes of planting sciophytes in the PV power plant in karst rocky desertification area without any artificial sunshade and improving the land output rate and land utilization rate in the PV power plant.

SUMMARY

In view of this, the present application provides a method for interplanting grape and *Polygonatum kingianum* in a PV power plant, to solve the following problems: a large number of manpower and material resources consumption during planting sciophytes in a rocky-desertified PV power plant, lower comprehensive land yield and lower land utilization rate in the PV power plant.

To achieve the above objective, the present application adopts the following technical solutions.

A method for interplanting grape and *Polygonatum kingianum* in a PV power plant, where the PV power plant includes a plurality of PV modules, and the method includes the following steps:

step S1, configuring a plurality of uprights in the PV power plant, each of the uprights being located in a space formed by the plurality of PV modules, where in a same space, a height of an upright close to south of the PV modules is lower than a height of an upright close to north of the PV modules, the height of the upright close to the south of the PV modules is 0.8-1.0 m, and the height of the upright close to the north of the PV modules is 1.8-2.2 m;

step S2, welding a traction crossbar between adjacent two of the uprights in an east-west direction, and welding a supporting bar between adjacent two of the uprights in a south-north direction; linking a plurality of iron wires between the supporting bars to form a wire mesh that is coplanar with the traction crossbars and is placed, higher in south and lower in north; the traction crossbar is welded to the south upright at 1.6-2.0 m above the ground, to form a grapevine traction frame;

step S3, making a grape ridge at a bottom of a side close to the south of each PV module, digging planting pits on the grape ridge and planting grape seedlings free of disease and insect and pest damage; the grape ridge has a width of 1 m; the planting pits each have a size of 40 cm×40 cm×50 cm, and adjacent two of the grape seedlings free of disease and insect and pest damage are spaced by 1.8-2.4 m;

step S4, maintaining two branches for each of the grape seedlings free of disease and insect and pest damage and pulling the two branches along the traction crossbar close to lower south of each PV module in a same year of grape planting; pulling branches grown out from arm bud points southwards onto the wire mesh in a next year of grape planting;

step S5, sowing a green manure on a plowing layer in the same year of grape planting, and ploughing the green manure in fast-growing seasons; and step S6, in autumn of the year after ploughing the green manure, making a planting bed below the grapevine traction frame and in a shade formed by each PV module, digging pits in the planting bed and planting *Polygonatum kingianum* with a row spacing of 30 cm×40 cm.

Preferably, each of the PV modules comprises a PV panel and a PV bracket;

the PV panel is mounted on the PV bracket;

the PV panel has a vertical height of not less than 2.5 m from a lowest edge thereof to the ground; the lowest edge is located south of the PV module; a guiding gutter is further disposed in a place close to the lowest edge of the PV module; the guiding gutter is communicated with a ditch in the south-north direction of the PV power plant, to guide rainwater intercepted by the PV panel into the ditch.

Preferably, prior to the step S1, the method further includes the following steps:

ploughing land in the PV power plant until a depth of 30 cm, airing the land for 2-3 d, applying 4,000-5,000 kg of a farmyard manure and 40-60 kg of calcium superphosphate per Mu; raking the land after rotary tillage as the plowing layer;

mounting a drip irrigation system on a surface of the plowing layer and mounting a soil moisture monitoring probe in the plowing layer, where the soil moisture monitoring probe is connected to a data cloud platform and is configured to detect a soil moisture in the plowing layer, to obtain soil moisture information;

performing statistics on the soil moisture information by the data cloud platform according to time granularity, to obtain moisture spatial and temporal dynamics of the plowing layer;

determining an optimal watering time and an optimal watering frequency based on the moisture spatial and temporal dynamics; and controlling the drip irrigation system to conduct watering according to the optimal watering time and the optimal watering frequency.

Preferably, the drip irrigation system includes a drip tape and a drip head; and the step of mounting a drip irrigation system on a surface of the plowing layer and mounting a soil moisture monitoring probe in the plowing layer includes:

paving the drip tape in the space and below the plurality of PV panels in the east-west direction;

embedding the soil moisture monitoring probe below the side close to the south of each PV module, between the PV modules, and just under the PV panel, separately; the probe below the side close to the south of each PV module has a depth of 40 cm, the probe between the PV modules has a depth of 15 cm, and the probe just under the PV panel has a depth of 15 cm.

Preferably, the plurality of uprights are stainless steel tubes; adjacent two of the uprights located north have a spacing of 8-10 m; adjacent two of the uprights located south have a spacing of 8-10 m.

Preferably, adjacent two of the uprights close to the south of the PV modules have a spacing of 8-10 m; adjacent two of the uprights close to the north of the PV modules have a spacing of 8-10 m, including:

punching a plurality of holes on each of the supporting bars, and hanging iron wires on each of the holes to form a transmeridional wire array that is coplanar with the traction crossbars and is placed, higher in south and lower in north, to form a wire mesh;

where a spacing between the iron wires is 40-50 cm.

Preferably, the method further includes:

the wire mesh further including a shading net; fixing one side of the shading net onto the traction crossbar located in the south, and collecting another side of the shading net into a metal tube, where the metal tube may be movable on the wire mesh in the south-north direction;

moving the metal tube northwards to unfold the shading net when grape branches are incapable of shaping *Polygonatum kingianum* corresponding to each of the PV modules, and moving the metal tube southwards gradually to close up the shading net as grape branches are grown.

Preferably, the step of digging planting pits on the grape ridge and planting grape seedlings free of disease and insect and pest damage includes:

filling 1-2 kg of an organic compost into planting pits and covering soil having a thickness of 5 cm, and placing the grape seedlings free of disease and insect and pest damage that are soaked into a rooting agent solution for half an hour into the planting pits and planting.

Preferably, the green manure includes Leguminosae and Cruciferous plants.

Preferably, after planting *Polygonatum kingianum*, the method further includes:

covering a mixture of Cronartieae and Fagaceae leaves having a thickness of 10 cm, and watering thoroughly.

Compared with the prior art, the present application has the following advantages:

In the present application, a grapevine traction frame which is higher in south and lower in north is built in a space formed by PV modules in the PV power plant, to plant heliophilous grape; and sciophilous *Polygonatum kingianum* is planted in the shades of the PV modules and the grapevine traction frame. The present application is integrated with PV power generation, heliophiles for shaping and planting of sciophilous traditional Chinese medicinal materials, which not only produces clean energy in the PV power plant, but also makes full use of the space resources to obtain products of grape and *Polygonatum kingianum*, thereby greatly improving the land output rate and land utilization rate of the PV power plant. Moreover, to plant a green manure prior to planting *Polygonatum kingianum*, may not only effectively improve the original weak and infertile soil of the PV power plant, but also further increase the comprehensive land utilization ratio. Therefore, the present application is especially suitable for the rocky-desertified PV power plant.

Figure 1:
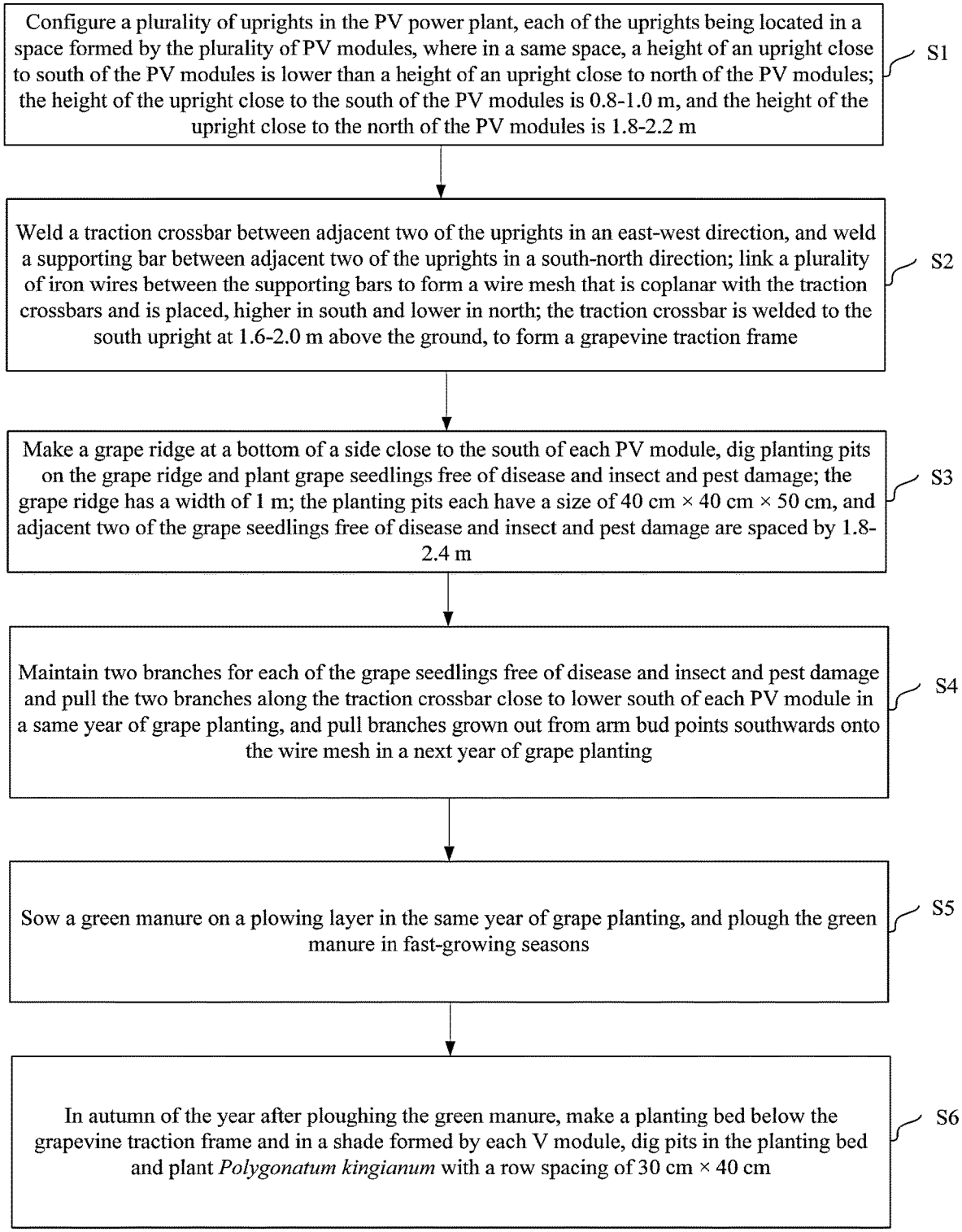
FIG. 1 is a flow chart of a method for interplanting grape and *Polygonatum kingianum* in a PV power plant.

Reference numerals: 11, plowing layer; 12, drip irrigation system; 121, drip tape; 122, drip head; 13, soil moisture monitoring probe; 14, solar panel; 15, storage battery; 21, upright close to the south of PV module; 22, traction crossbar close to the south of PV module; 23, upright close to the north of PV module; 24, traction crossbar close to the north of PV module; 25, shading net; 26, supporting bar; 27, iron wire; 28, metal tube; 31, grape ridge; 41, "double-arm" of grape plant; 42, "single-wing" of grape plant; 71, guiding gutter, 72, PV panel; 73, PV bracket.

DETAILED DESCRIPTION OF THE EMBODIMENTS

To make the above objectives, features and advantages of the present application more apparent, preferred embodiments in the present application will be described in detail with reference to accompanying drawings. It should be understood that the following examples are merely for the purpose of illustration, but are not construed as limiting the scope of the present application. Those skilled in the art can make various modifications and substitutions to the present application without departing from the purpose and spirit of the present application. The materials, reagents, and the like used in the following examples are all commercially available, unless otherwise specified.

The applicant found that the rocky-desertified PV power plants in Yunnan are rich in light resources and thus, not suitable for the growth of sciophytes; the shading from PV modules changes the near-surface environment and creates a shading environment to provide a chance for the change of the original land utilization ways. However, there still exists the problems of lower land yield and land utilization ratio in the PV power plant.

In view of this, based on an integrated pattern of PV module shading, heliophilous grape shading and sciophilous *Polygonatum kingianum* planting, the present application improves the original weak and infertile soil of the rocky-desertified PV power plant via crop rotation of the green manure and *Polygonatum kingianum*, and obtains products of grape and *Polygonatum kingianum*, and increases the land yield and land utilization ratio in the PV power plant.

Specifically, the present application provides a method for interplanting grape and *Polygonatum kingianum* in a PV power plant.

The PV power plant includes a plurality of PV modules, and each of the PV modules contains a PV panel and a PV bracket; the PV panel is mounted on the PV bracket. The PV panel has a vertical height of not less than 2.5 m from a lowest edge thereof to the ground; the lowest edge is located south of the PV module; a guiding gutter is further disposed in a place close to the lowest edge of the PV module; the guiding gutter is communicated with a ditch in the south-north direction of the PV power plant, to guide rainwater intercepted by the PV panel into the ditch.

When the vertical height of the PV panel from the lowest edge to the ground is not less than 2.5 m, an adequate growing space may be retained for *Polygonatum kingianum* planted below the PV panel; such a configuration is convenient for the staff of the PV power plant to walk and work. Moreover, rainwater in the plant area is collected to the ditch based on the guiding gutter; water may be pumped by means of PV power generation to drive the drip irrigation system for irrigation, which achieves the efficient utilization of water resources in the power plant.

FIG. 1 depicts a flow chart of a method for interplanting grape and *Polygonatum kingianum* in a PV power plant. As shown in FIG. 1, the method includes the following steps:

step S1: a plurality of uprights are configured in the PV power plant, each of the uprights is located in a space formed by the plurality of PV modules; in a same space, a height of an upright close to south of the PV modules is lower than a height of an upright close to north of the PV modules, the height of the upright close to the south of the PV modules is 1.0 m, and the height of the upright close to the north of the PV modules is 2.2 m.

The uprights close to the south of the PV modules are configured to be lower than the uprights close to the north of the PV modules in height, to form a grapevine traction frame which is higher in south and lower in north such that grape vines are grown towards the direction rich in light resources along the traction frame.

In an optional embodiment, the plurality of uprights in the step S1 are stainless steel tubes. Adjacent two of the uprights located south of the PV modules have a spacing of 8-10 m; adjacent two of the uprights located north of the PV modules have a spacing of 8-10 m.

The spacing between adjacent two uprights located in the south of each PV module and the spacing between adjacent two uprights located in the north of each PV module are set as 8-10, respectively, which satisfies the demands for supporting grape vines, reduces frame costs and is convenient for management.

Step S2, a traction crossbar is welded between adjacent two of the uprights in an east-west direction, and a supporting bar is welded between adjacent two of the uprights in a south-north direction; a plurality of iron wires are linked between the supporting bars to form a wire mesh that is coplanar with the traction crossbars and is placed, higher in south and lower in north; the traction crossbar is welded to the south upright at 1.6-2.0 m above the ground, to form a grapevine traction frame.

The traction crossbar in the east-west direction and the supporting bars in the south-north direction are fixed via stainless-steel uprights in the space formed by the PV modules to build a grapevine traction frame. The grapevine traction frame formed may bear the weight of the grape vines fully and avoid the possible problem of excessive collapse of the frame surface. Meanwhile, the grapevine traction frame creates a sunny environment for heliophilous grape to grow.

In an optional embodiment, the wire mesh in the step 2 may be built by the following method:
where a spacing between the supporting bars is 8-10 m; the step of linking a plurality of iron wires between the supporting bars to form a wire mesh that is coplanar with the traction crossbars and is placed, higher in south and lower in north includes:
punching a plurality of holes on each of the supporting bars, and hanging iron wires on each of the holes to form a transmeridional wire array that is coplanar with the traction crossbars and is placed, higher in south and lower in north, to form a wire mesh;
where a spacing between the iron wires is 40-50 cm.

The iron wires for traction may be removable. When grape and *Polygonatum kingianum* are in non-growing seasons, the iron wires may be taken down, so as to reduce the effects and damage on the iron wires from the environment, and prolong the service life of the iron wires.

In another optional embodiment, the wire mesh further includes a shading net; one side of the shading net is fixed onto the traction crossbar located in the north of the PV modules, and another side of the shading net is collected into a metal tube; the metal tube may be movable on the wire mesh in the south-north direction;
the metal tube is moved northwards to unfold the shading net when grape branches are incapable of shaping *Polygonatum kingianum* corresponding to each of the PV modules, and the metal tube is moved southwards gradually to close up the shading net as grape branches are grown.

In this example, the shading net for shading *Polygonatum kingianum* is paved with the grapevine traction frame, which saves the construction cost of the sunshade and achieves the diversified utilization of the grapevine traction frame. Meanwhile, as the grape wines are grown to increase the shading area, the shading net will be closed up gradually, which may prolong the service life of the shading net effectively. Based on this, *Polygonatum kingianum* between the PV modules may be shaded sufficiently via a shading mode of "grapevine-in-shed-out" jointly formed by the grape vines and shading net.

Step 3, a grape ridge is made at a bottom of a side close to the south of each PV module, planting pits are dig on the grape ridge and grape seedlings free of disease and insect and pest damage are planted; the grape ridge has a width of 1 m; the planting pits each have a size of 40 cm×40 cm×50 cm, and adjacent two of the grape seedlings free of disease and insect and pest damage are spaced by 1.8 m.

In an optional embodiment, the grape seedlings free of disease and insect and pest damage further need to be soaked into a rooting agent solution for half an hour prior to planting, and then, 1-2 kg of an organic compost is filled into the planting pits and the pits are covered with soil having a thickness of 5 cm, and the soaked grape seedlings free of disease and insect and pest damage are placed into the planting pits and planted.

Step S4, two branches are maintained for each of the grape seedlings free of disease and insect and pest damage and pulled along the traction crossbar close to a lower south of each PV module in a same year of grape planting; branches grown out from arm bud points were pulled southwards onto the wire mesh in a next year of grape planting.

As the planted grape is heliophilous, the space formed by PV modules may satisfy its growing environment in the PV power plant only, and then a grapevine traction frame that is higher in north and lower in north is built in the specific environment of the space. In the same year of grape planting, two branches are maintained for each of the grape seedling and pulled along the traction crossbar located in south of the space, to form "double-arm" of the rape plant; in the next year of grape planting, branches grown out from arm bud points are pulled southwards onto the wire mesh, to form a "single-wing" of the grape plant. Therefore, such a configuration makes the grape plant getting enough sunlight and increases the shading area of the grape vine.

Afterwards, in winter of the grape planting year, the grape vine is trimmed, fruiting tips are maintained in a height of about 1 m within the fruit-bearing area, convenient for picking grape.

Step S5: in the same year of grape planting, a green manure is sown on a plowing layer in the PV power plant, and then ploughed in fast-growing seasons.

In an optional embodiment, the green manure may be Leguminosae and Cruciferous plants, such as, *Medicago sativa*, *Astragalus sinicus*, and *Brassica napus*. The green manure is sown in autumn of the grape planting year, namely, prior to planting *Polygonatum kingianum*, and then ploughed in fast-growing seasons. Such a configuration may improve the nitrogen content and organic content in soil of the PV power plant, reduce the volume weight of the soil plowing layer, enhance microbial activity and increase the ratio of beneficial microorganisms, improve soil and solve the problem of soil depletion in the PV power plant, in particular to the soil of the rocky-desertified PV power plant.

Step S6: a planting bed is made below the grapevine traction frame and in a shade formed by each PV module in autumn of the year after ploughing the green manure, pits are dig in the planting bed to plant *Polygonatum kingianum* with a row spacing of 30 cm×40 cm.

*Polygonatum kingianum* is heliophobous, therefore, planting beds are made below the grapevine traction frame and in the shade formed by each PV module and then planting pits are dig in the planting beds to plant *Polygonatum kingianum*, thereby ensuring the shading growth environment for *Polygonatum kingianum*.

In an optional embodiment, *Polygonatum kingianum* further needs to be covered with a mixture of Cronartieae and Fagaceae leaves having a thickness of 10 cm after planting, and then watered thoroughly. The leaf mixture may be the mixture of *Pinus yunnanensis* and *Quercus cocciferoides* leaves in Yunnan rocky desertification areas.

In the example, directed to the rocky-desertified PV power plants located in Yunnan, fallen leaves of the local common species of trees, in particular to, *Pinus yunnanensis*, are covered on the surface of the *Polygonatum kingianum* after planting. Such a configuration may not only retain the soil moisture for the growth of *Polygonatum kingianum* and prevent weed invasion, but also may nourish functional microorganisms and improve the physical, chemical and biological properties of soil.

In an optional embodiment, prior to building the grapevine traction frame in step S1, the land within the PV power plant further needs to be ploughed until a depth of 30 cm and aired for 2-3 d, then applied with 4,000-5,000 kg of a farmyard manure and 40-60 kg of calcium superphosphate per Mu, and then used as a plowing layer, afterwards, grape, *Polygonatum kingianum* and green manure may be planted.

The ploughing may be conducted by means of small machinery with manpower, so as to achieve time saving and labor saving, and to ensure enough ploughing of soil in the power plant.

Farmyard manure contains abundant humic acid, some substances capable of stimulating root system growth and various beneficial soil microorganisms, which may accelerate the formation of a soil granular structure. Therefore, to apply farmyard manure per Mu may not only loosen soil, improve soil moisture and air conditions to be beneficial for root system growth, but also may enhance the manure and water retention of soil and raise earth temperature, thereby facilitating the activity and propagation of beneficial microorganisms in soil. Calcium superphosphate is rich in phosphorus, calcium, sulfur and other elements. To apply a proper amount of calcium superphosphate per Mu may not only provide phosphorus, calcium, sulfur and other elements, but also improve alkaline soil.

In another optional embodiment, a drip irrigation system and soil moisture monitoring probes are further mounted in the plowing layer; specifically, the drip irrigation system is mounted on the surface of the plowing layer and the soil moisture monitoring probes are mounted in the plowing layer. The soil moisture monitoring probe is further connected to a data cloud platform; the soil moisture monitoring probe is used to detect a soil moisture of the plowing layer to obtain soil moisture information; the data cloud platform conducts statistics on the soil moisture information according to time granularity, to obtain moisture spatial and temporal dynamics of the plowing layer; based on the moisture spatial and temporal dynamics, an optimal watering time and an optimal watering frequency are determined; the drip irrigation system is controlled to conduct watering according to the optimal watering time and the optimal watering frequency. The drip irrigation system includes a drip tape and a drip head; the solar panel and the storage battery supply energy for the drip irrigation system and the soil moisture monitoring probe.

In an optional embodiment, the drip tape and the soil moisture monitoring probe are mounted as follows:

paving the drip tape in the space and below the plurality of PV panels in the east-west direction;

embedding the soil moisture monitoring probe below the side close to the south of each PV module, between the PV modules, and just under the PV panel, separately; the probe below the side close to the south of each PV module has a depth of 40 cm, the probe between the PV modules has a depth of 15 cm, and the probe just under the PV panel has a depth of 15 cm.

In this example, soil moisture monitoring probes with different depth are configured according to the root system depth of grape and *Polygonatum kingianum*; each of the soil moisture monitoring probes is separately used to detect the moisture information of grape and *Polygonatum kingianum* root system in soil and to upload to the data cloud platform such that these soil moisture information is subjected to statistics by the data cloud platform according to the time granularity, thus obtaining the moisture spatial and temporal dynamics. Based on the moisture spatial and temporal dynamics obtained, the optimal watering time and watering frequency of the grape and *Polygonatum kingianum* may be determined scientifically, and the drip irrigation system is controlled to conduct watering.

In the example, a grapevine traction frame is built in a space formed by PV modules in the PV power plant, to plant heliophilous grape; and sciophilous *Polygonatum kingianum* is planted below the grapevine traction frame and in the shades of the PV modules. The present application is integrated with PV power generation, heliophiles for shaping and planting of sciophilous traditional Chinese medicinal materials, which not only produces clean energy in the PV power plant, but also makes full use of the space resources in the power plant to obtain products of grape and *Polygonatum kingianum*, thereby greatly improving the land output rate and land utilization rate of the PV power plant. Moreover, to plan a green manure prior to planting *Polygonatum kingianum*, may not only effectively improve the original weak and infertile soil of the PV power plant, but also further increase the comprehensive land utilization ratio. Therefore, the present application is especially suitable for the rocky-desertified PV power plant.

Figure 2:
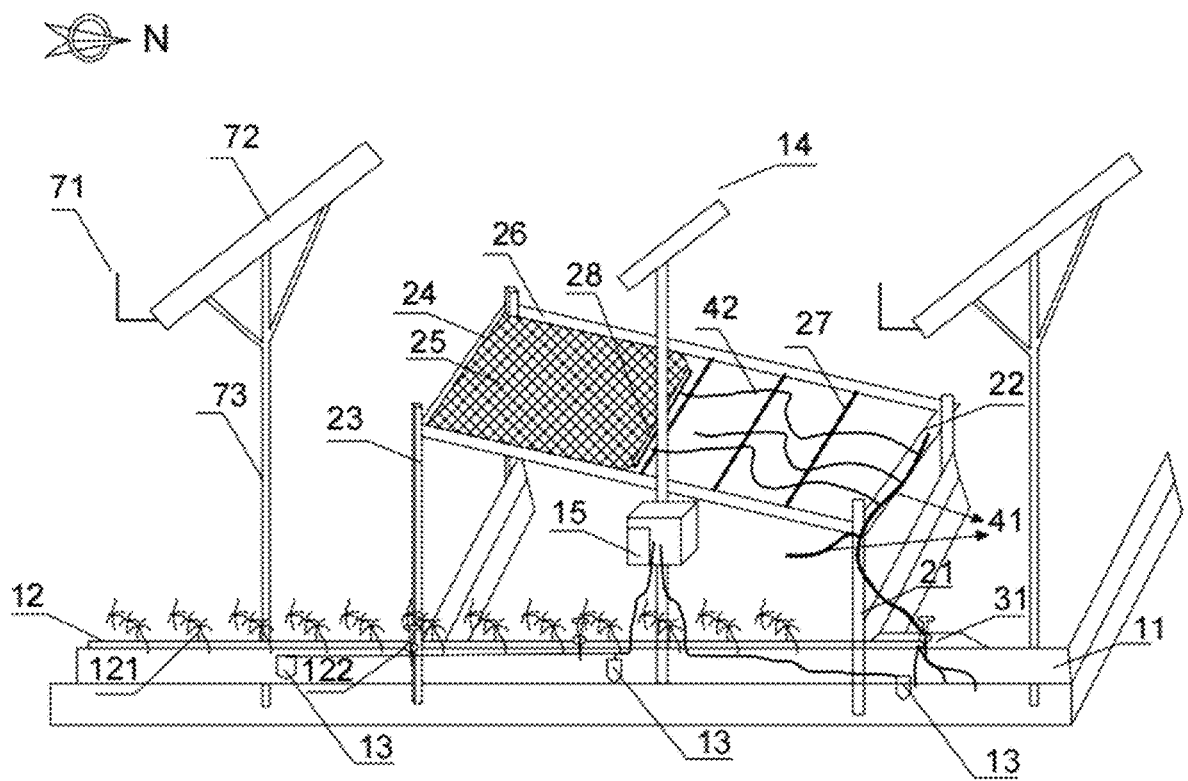
FIG. 2 is a schematic diagram showing a structure in Example I of the present application.

The present application will be descried illustratively with reference to a detailed embodiment and FIG. 2 below:

FIG. 2 depicts a schematic diagram showing a structure of Example I of the present application. As shown in FIG. 2, the PV power plant includes: plowing layer 11; drip irrigation system 12; drip tape 121; drip head 122; soil moisture monitoring probe 13; solar panel 14; storage battery 15; upright close to the south of PV module 21; traction crossbar close to the south of PV module 22; upright close to the north of PV module 23; traction crossbar close to the north of PV module 24; shading net 25; supporting bar 26; iron wire 27; metal tube 28; grape ridge 31; "double-arm" of grape plant 41; "single-wing" of grape plant 42; guiding gutter 71; PV module 72, and PV bracket 73; of which one PV panel 72 and one PV bracket 73 form a PV module.

Example I

A rocky-desertified PV power plant in Yunnan was set as an example in Example I.

Before building a grapevine traction frame, land in the PV power plant was ploughed until a depth of 30 cm by means of small machinery with manpower, aired for 2-3 d, and 4,500 kg of a farmyard manure and 45 kg of calcium superphosphate were applied per Mu; the land was harrowed after rotary tillage as a plowing layer 11; a drip irrigation system 12 and soil moisture monitoring probes 13 were mounted on the plowing layer 11. The drip irrigation system 12 includes a drip tape 121 and a drip head 122. Drip tapes were paved in the space formed by a plurality of PV modules and below a plurality of PV panel 72 in an east-west direction; soil moisture monitoring probes 13 were embedded into soil below the grape ridge 31, between the PV modules, and just under the PV panel 72. The probe below the grape ridge 31 has a depth of 40 cm; the probe between the PV modules has a depth of 15 cm, and the probe just under the PV panel 72 has a depth of 15 cm.

Step S1, 4 uprights were configured in the PV power plant, and each of the uprights was located in a space formed by a plurality of PV modules; a height of an upright 21 located in north was lower than a height of an upright 23 located in south; the height of the upright 21 located in north had a height of 1.0 m, and the height of the upright 23 located in south had a height of 2.2 m.

Step S2, a traction crossbar was welded between adjacent two of the uprights in an east-west direction, and a supporting bar 26 was welded between adjacent two of the uprights in a south-north direction; a plurality of iron wires 27 were linked between the supporting bars 26, to form a wire mesh that is coplanar with the traction crossbars and is placed, higher in south and lower in north; the traction crossbar welded on the south upright 23 had a length of 1.8, to form a grapevine traction frame. The wire mesh further has a shading net 25; one side of the shading net 25 is fixed onto the traction crossbar 24 located in south, and another side of the shading net is collected into a metal tube 28.

Step S3, a grape ridge 31 was made at a bottom of a side close to the south of each PV module, planting pits were dig on the grape ridge 31 and grape seedlings free of disease and insect and pest damage were planted; 2 kg of an organic compost was filled in the planting pits and covered with soil having a thickness of 5 cm; the grape seedlings free of disease and insect and pest damage which had been soaked into a rooting agent solution for half an hour were placed into the planting pits and planted; the grape seedlings free of disease and insect and pest damage were spaced by 1.8 m; where the grape ridge 31 has a width of 1 m; the planting pits each have a size of 40 cm×40 cm×50 cm.

Step S4, two branches were maintained for each of the grape seedlings free of disease and insect and pest damage and pulled along the traction crossbar 22 located in north, to form the "double-arm" 41 of the grape plant; branches grown out from arm bud points were pulled southwards onto the wire mesh in a next year of grape planting, to form the "single wing" 42 of the grape plant. Afterwards, in winter of the grape planting, the grape vine was trimmed, fruiting tips were maintained in a height of about 1 m within the fruit-bearing area, convenient for picking grape.

Step S5, in the same year of grape planting, *Medicago sativa* was sown on the plowing layer 11 in the PV power plant, and then ploughed in fast-growing seasons.

Step S6, in autumn of the year after ploughing *Medicago sativa*, a planting bed was made below the grapevine traction frame and in a shade formed by each PV module, pits were dig in the planting bed to plant *Polygonatum kingianum* with a row spacing of 30 cm×50 cm. A mixture of *Pinus yunnanensis* and *Quercus cocciferoides* leaves having a thickness of 10 cm was covered on the pits after planting *Polygonatum kingianum*, and watered thoroughly.

In Example I, to guarantee the quality and output of the grape fruit and *Polygonatum kingianum*, grape was subjected to flower thinning and young fruit picking in due time, and flower buds of *Polygonatum kingianum* were picked off in the reproductive stage.

In Example I, in early spring and summer, when the shading area of the grape branches was smaller, the shading net may be unfolded to shade *Polygonatum kingianum* between PV modules in combination with grape branches. As grape branches were grown along the traction wire, the shading area was increased, and then, the shading net was closed up gradually, so as to form a "grapevine-in-shed-out" shading mode. Meanwhile, the PV panel achieves shading for *Polygonatum kingianum* just under itself without building a *Polygonatum kingianum* shade additionally.

All embodiments in this description focus on the differences from other embodiments. The same or similar portions of these embodiments may refer to one another.

Although preferred embodiments of the present application have been described, persons skilled in the art can make changes and modifications to these embodiments once they learn the basic inventive concept. Therefore, the appended claims are intended to be construed as covering the preferred embodiments and all changes and modifications falling within the scope of the embodiments of the present application.

Finally, it should be further noted that, in this description, relationship terms such as first and second are only used to distinguish an entity or operation from another entity or operation, but do not necessarily require or imply that there is any actual relationship or order between these entities or operations. Moreover, the terms "include", "comprise" or any other variants thereof are intended to cover non-exclusive inclusion, so that a process, method, article or terminal device including a series of elements not only includes those elements, but also includes those elements that are not explicitly listed, or also includes elements inherent to this process, method, article or terminal device. Without more restrictions, the elements defined by the sentence "including a . . . " do not exclude the existence of other identical elements in the process, method, article, or terminal device including the elements.

The method for interplanting grape and *Polygonatum kingianum* in a PV power plant provided herein are described above in detail. Several examples are used for illustration of the principles and implementations of the present application. The description of these examples is only used to help understand the method and its core principles of the present application. In addition, those of ordinary skill in the art can make various modifications in terms of detailed embodiments and scope of application in accordance with the ideas of the present application. In conclusion, the content of this description shall not be construed as a limitation to the present application.

What is claimed is:

1. A method for interplanting grape and *Polygonatum kingianum* in a photovoltaic (PV) power plant, wherein the PV power plant comprises a plurality of PV modules and the method comprises the following steps:
   step S1, configuring a plurality of uprights in the PV power plant, each of the uprights being located in a space formed by the plurality of PV modules, wherein in a same space, a height of an upright at south of the PV modules is lower than a height of an upright at north of the PV modules, the height of the upright at south of the PV modules is 0.8-1.0 m, and the height of the upright at north of the PV modules is 1.8-2.2 m;
   step S2, welding a traction crossbar between adjacent two of the uprights in an east-west direction, and welding a supporting bar between adjacent two of the uprights in a south-north direction; linking a plurality of iron wires between the supporting bars to form a wire mesh that is coplanar with the traction crossbar and is placed, higher in south and lower in north, wherein the traction crossbar is welded to the south upright at 1.6-2.0 m above the ground, to form a grapevine traction frame;
   step S3, making a grape ridge at a bottom of a south side of each PV module, digging planting pits on the grape ridge and planting grape seedlings free of disease and insect and pest damage, wherein the grape ridge has a width of 1 m; the planting pits each have a size of 40 cm×40 cm×50 cm, and adjacent two of the grape seedlings free of disease and insect and pest damage are spaced by 1.8-2.4 m;
   step S4, maintaining two branches for each of the grape seedlings free of disease and insect and pest damage and pulling the two branches along the traction crossbar below south of each PV module in a same calendar year of grape planting; pulling branches grown out from arm bud points southwards onto the wire mesh in a next calendar year of grape planting;
   step S5, sowing a green manure on a plowing layer in the same calendar year of grape planting, and ploughing the green manure at growing season; and
   step S6, in autumn of the calendar year after ploughing the green manure, making a planting bed below the grapevine traction frame and in a shade formed by each PV module, digging pits in the planting bed and planting *Polygonatum kingianum* with a row spacing of 30 cm×40 cm.

2. The method according to claim 1, wherein each of the PV modules comprises a PV panel and a PV bracket;
   wherein the PV panel is mounted on the PV bracket; and
   wherein the PV panel has a vertical height of not less than 2.5 m from a lowest edge thereof to the ground; the lowest edge is located south of the PV modules; a guiding gutter is further disposed in a place close to the lowest edge of the PV modules; the guiding gutter is communicated with a ditch in the south-north direction of the PV power plant, to guide rainwater intercepted by the PV panel into the ditch.

3. The method according to claim 1, wherein prior to the step S1, the method further comprising the following steps:
   ploughing land in the PV power plant until a depth of 30 cm, airing the land for 2-3 days, applying 4,000-5,000 kg of a farmyard manure and 40-60 kg of calcium superphosphate per 667 $m^2$; raking the land after rotary tillage as the plowing layer; and
   mounting a drip irrigation system on a surface of the plowing layer and mounting a soil moisture monitoring probe in the plowing layer, wherein the soil moisture monitoring probe is connected to a data cloud platform and is configured to detect a soil moisture in the plowing layer, to obtain soil moisture information.

4. The method according to claim 3, wherein the drip irrigation system comprises a drip tape and a drip head; and the step of mounting a drip irrigation system on a surface of the plowing layer and mounting a soil moisture monitoring probe in the plowing layer comprises:
   paving the drip tape in the space and below the plurality of PV modules in the east-west direction; and
   embedding the soil moisture monitoring probe into soil below the south side of each PV module, between the PV modules, and just under a PV panel, separately;
   wherein the soil moisture monitoring probe below the south side of each PV module has a depth of 40 cm, the soil moisture monitoring probe between the PV modules has a depth of 15 cm, and the soil moisture monitoring probe just under the PV panel has a depth of 15 cm.

5. The method according to claim 1, wherein the plurality of uprights are stainless steel tubes; adjacent two of the uprights at south of the PV modules have a spacing of 8-10 m; and adjacent two of the uprights at north of the PV modules have a spacing of 8-10 m.

6. The method according to claim 1, wherein a spacing between the supporting bars is 8-10 m; the step of linking a plurality of iron wires between the supporting bars to form a wire mesh that is coplanar with the traction crossbar and is placed, higher in south and lower in north comprises:
   punching a plurality of holes on each of the supporting bars, and hanging iron wires on each of the holes to form a transmeridional wire array that is coplanar with the traction crossbar and is placed, higher in south and lower in north;
   wherein a spacing between the iron wires is 40-50 cm.

7. The method according to claim 6, further comprising:
the wire mesh further comprising a shading net; fixing one side of the shading net onto the traction crossbar located in south, and collecting another side of the shading net into a metal tube, wherein the metal tube is capable of moving on the wire mesh in a south-north direction;
moving the metal tube northwards to unfold the shading net when grape branches are capable of shaping *Polygonatum kingianum* corresponding to each of the PV modules; and moving the metal tube southwards gradually to close up the shading net as grape branches are grown.

8. The method according to claim 1, wherein the step of digging planting pits on the grape ridge and planting grape seedlings free of disease and insect and pest damage comprises:
filling 1-2 kg of an organic compost into the planting pits and covering soil having a thickness of 5 cm, and placing the grape seedlings free of disease and insect and pest damage that are soaked into a rooting agent solution for half an hour into the planting pits and planting.

9. The method according to claim 1, wherein the green manure comprises Leguminosae and Cruciferous plants.

10. The method according to claim 1, wherein after planting of *Polygonatum kingianum*, the method further comprises:
covering a mixture of Cronartieae and Fagaceae leaves having a thickness of 10 cm, and watering thoroughly.

* * * * *